(12) United States Patent
Chae et al.

(10) Patent No.: US 10,752,125 B2
(45) Date of Patent: Aug. 25, 2020

(54) MOBILE CHARGING SYSTEM AND OPERATION METHOD THEREOF

(71) Applicants: HYUNDAI MOTOR COMPANY, Seoul (KR); KIA MOTORS CORPORATION, Seoul (KR)

(72) Inventors: Jun Byung Chae, Seoul (KR); Byeong Geon Jeon, Pohang-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/168,350

(22) Filed: Oct. 23, 2018

(65) Prior Publication Data

US 2020/0031239 A1 Jan. 30, 2020

(30) Foreign Application Priority Data

Jul. 26, 2018 (KR) .................. 10-2018-0087350

(51) Int. Cl.
| | |
|---|---|
| *B60L 53/65* | (2019.01) |
| *G08G 1/00* | (2006.01) |
| *G07C 5/00* | (2006.01) |
| *B60W 50/00* | (2006.01) |

(52) U.S. Cl.
CPC .............. *B60L 53/65* (2019.02); *G08G 1/20* (2013.01); *B60W 2050/008* (2013.01); *G07C 5/008* (2013.01)

(58) Field of Classification Search
USPC ........................................................ 320/109
See application file for complete search history.

(56) References Cited

U.S. PATENT DOCUMENTS

2017/0140349 A1\* 5/2017 Ricci ................... G06Q 20/102

FOREIGN PATENT DOCUMENTS

| KR | 10-2016-0108962 A | 9/2016 |
|---|---|---|
| KR | 101852118 B1 | 4/2018 |

\* cited by examiner

*Primary Examiner* — Bryce M Aisaka
(74) *Attorney, Agent, or Firm* — Morgan, Lewis & Bockius LLP (57) ABSTRACT

A mobile charging system includes: at least one or more vehicles collecting and transmitting vehicle information; at least one or more mobile chargers collecting and transmitting charger information and supplying charging power to the at least one or more vehicles; and a server performing clustering within a range that each of the at least one or more mobile chargers is capable of covering, based on the vehicle information and the charger information and determining a standby location of each of the at least one or more mobile chargers and a charging location of each of the at least one or more vehicles in each cluster.

18 Claims, 5 Drawing Sheets

MOBILE CHARGING SYSTEM AND OPERATION METHOD THEREOF

CROSS-REFERENCE TO RELATED APPLICATION

This application is based on and claims the benefit of priority to Korean Patent Application No. 10-2018-0087350, filed on Jul. 26, 2018, in the Korean Intellectual Property Office, the disclosure of which is incorporated herein in its entirety by reference.

TECHNICAL FIELD

The present disclosure relates to a mobile charging system, which assists the charging of an eco-friendly vehicle, and an operation method thereof.

BACKGROUND

As global environmental problems arise, eco-friendly vehicles such as electric vehicles have been widely distributed. Due to the wide distribution of eco-friendly vehicles, the charging infrastructure for battery charging of a vehicle has been expanded. However, the expansion of the charging infrastructure is proceeding at a slow pace. As such, a driver does not find the charging station and thus has a difficulty in the driving of a vehicle, when the driver is driving the vehicle for a long distance.

Furthermore, since the driver visits the charging station, parks the vehicle, and performs the charging, the driver needs to determine the movable destination in consideration of a battery capacity, a battery level, a distance to the charging station, and the like. In addition, there is no countermeasure, when a battery is discharged while the vehicle is driving.

SUMMARY

The present disclosure has been made to solve the above-mentioned problems occurring in the prior art while advantages achieved by the prior art are maintained intact.

An aspect of the present disclosure provides a mobile charging system that is located at an optimal standby location of a mobile charging station by using information provided from a vehicle and the mobile charging station and an operation method thereof.

An aspect of the present disclosure provides a mobile charging system that allocates an optimal charging location by using information provided from a vehicle and a mobile charging station and an operation method thereof.

The technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, a mobile charging system may include: at least one or more vehicles collecting and transmitting vehicle information; at least one or more mobile chargers collecting and transmitting charger information and supplying charging power to the at least one or more vehicles; and a server performing clustering within a range that each of the at least one or more mobile chargers is capable of covering, based on the vehicle information and the charger information and determining a standby location of each of the at least one or more mobile chargers and a charging location of each of the at least one or more vehicles in each cluster.

The vehicle information may include vehicle identification information, a vehicle battery level, a destination, a movement path, and a vehicle speed.

The charger information may include charger identification information, a charger battery level, a movable distance, and a movable speed.

The server may perform the clustering based on the number of vehicles that each of the at least one or more mobile chargers in each cluster is capable of covering, a movable distance, and a movable path.

The server may wirelessly communicate with the at least one or more vehicles and the at least one or more mobile chargers over telematics communication.

Each of the at least one or more mobile chargers may move to the standby location determined by the server, and then stand by.

Each of the at least one or more mobile chargers may move to the determined charging location to perform vehicle charging, when each of the at least one or more vehicles approves the charging location determined by the server.

Each of the at least one or more mobile chargers may supply charging power by wired.

Each of the at least one or more mobile chargers may supply charging power wirelessly.

According to another embodiment of the present disclosure, a mobile charging support server may include: a communication device receiving vehicle information and charger information from at least one or more vehicles and at least one or more mobile chargers; and a processor performing clustering within a range that each of the at least one or more mobile chargers is capable of covering, based on the vehicle information and the charger information and determining a standby location of each of the at least one or more mobile chargers and a charging location of each of the at least one or more vehicles in each cluster.

According to another embodiment of the present disclosure, a vehicle may include: a battery; a detector obtaining vehicle information; a communication device transmitting the vehicle information to a server; a processor directing the vehicle to move to a charging location, when receiving the charging location from the server and a charging controller receiving charging power from a mobile charger, which moves to the charging location, to control charging of the battery after the vehicle arrives at the charging location.

According to another embodiment of the present disclosure, an operation method of a mobile charging system may include steps of: receiving, by a server, vehicle information and charger information from at least one or more vehicles and at least one or more mobile chargers; performing, by the server, clustering within a range that each of the at least one or more mobile chargers is capable of covering, based on the vehicle information and the charger information; determining, by the server, a standby location of each of the at least one or more mobile chargers and a charging location of each of the at least one or more vehicles in a respective cluster; and moving to the charging location of each of the at least one or more vehicles to perform charging of each of the at least one or more vehicles, after each of the at least one or more mobile chargers stands by at the standby location in the respective cluster.

The vehicle information may include vehicle identification information, a vehicle battery level, a destination, a movement path, and a vehicle speed.

The charger information may include charger identification information, a charger battery level, a movable distance, and a movable speed.

In the performing of the clustering, the server may perform the clustering based on the number of vehicles that each of the at least one or more mobile chargers in the respective cluster is capable of covering, a movable distance, and a movable path.

The server may wirelessly communicate with the at least one or more vehicles and the at least one or more mobile chargers over telematics communication.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

Figure 1:
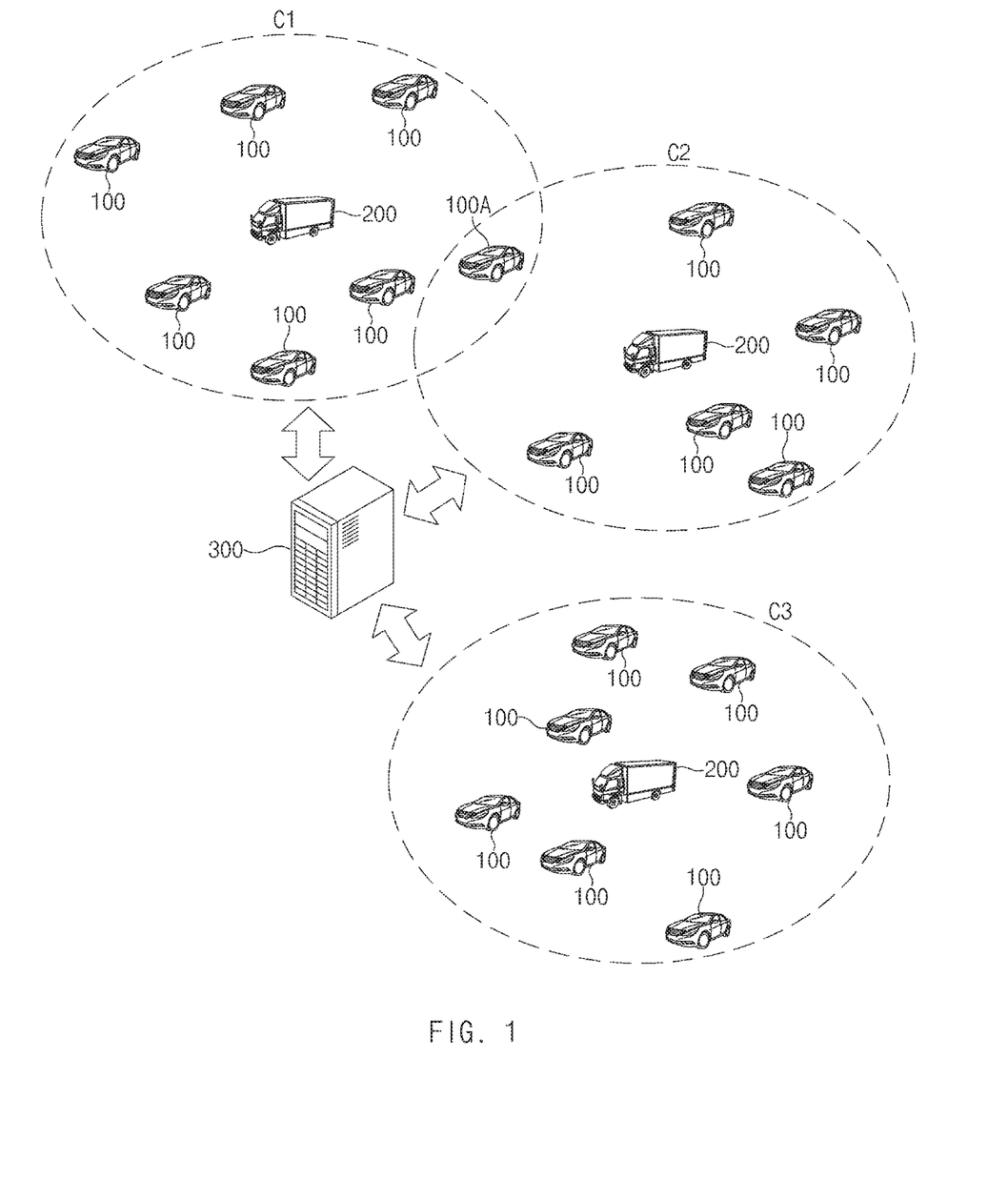
FIG. 1 is a diagram illustrating a mobile charging system, according to an embodiment of the present disclosure.

FIG. 1 is a diagram illustrating a mobile charging system, according to an embodiment of the present disclosure.

Referring to FIG. 1, a mobile charging system may include at least one or more vehicles 100, at least one or more mobile chargers 200, and a mobile charging support server 300 (hereinafter referred to as a "server"). The server 300 exchanges data (information) with the vehicle 100 and the mobile charger 200 by using a wireless communication technology. Telematics, Wireless LAN (WLAN) (Wi-Fi), Wireless broadband (Wibro), World Interoperability for Microwave Access (Wimax), High Speed Downlink Packet Access (HSDPA), and/or mobile communication networks may be used as the wireless communication technology.

The vehicle 100 and the mobile charger 200 respectively collect vehicle information and charger information to transmit the collected vehicle information and the collected charger information to the server 300 depending on a predetermined transmission condition. Herein, the transmission condition may be set to a specific period or the amount of collected data, or the like.

The server 300 receives the vehicle information and the charger information from at least one or more vehicles 100 and 100A and the at least one or more mobile chargers 200. The server 300 performs clustering based on the received vehicle information and the received charger information. The server 300 sets a range, which is capable of being covered by the mobile charger 200, to clusters C1, C2 and C3 based on state information of the vehicle 100 or 100A.

The mobile charger 200 supports the charging of the vehicles 100 and 100A placed within the same cluster. As illustrated in FIG. 1, the vehicle 100A may receive charging support from the mobile chargers 200 placed in the clusters C1 and C2, when the vehicle 100A is placed in the overlapped area of the clusters C1 and C2. In other words, the vehicle 100A may receive charging power from the mobile charger 200 placed in the cluster C1 or may receive charging power from the mobile charger 200 placed in the cluster C2. In addition, the vehicle 100A may receive the charging power from the mobile chargers 200 placed in the clusters C1 and C2 at the same time. The mobile charger 200 requests a new charger to put in the charging of the vehicle 100A or operates in conjunction with nearby chargers, depending on the battery level of the charger 200.

The server 300 selects an optimal charging location based on the movement path, the battery level, or the like of the vehicle 100 or 100A in a cluster. The vehicles 100 and 100A and the mobile charger 200 perform communication via the server 300, meet each other at the optimal charging location, and perform charging.

Figure 2:
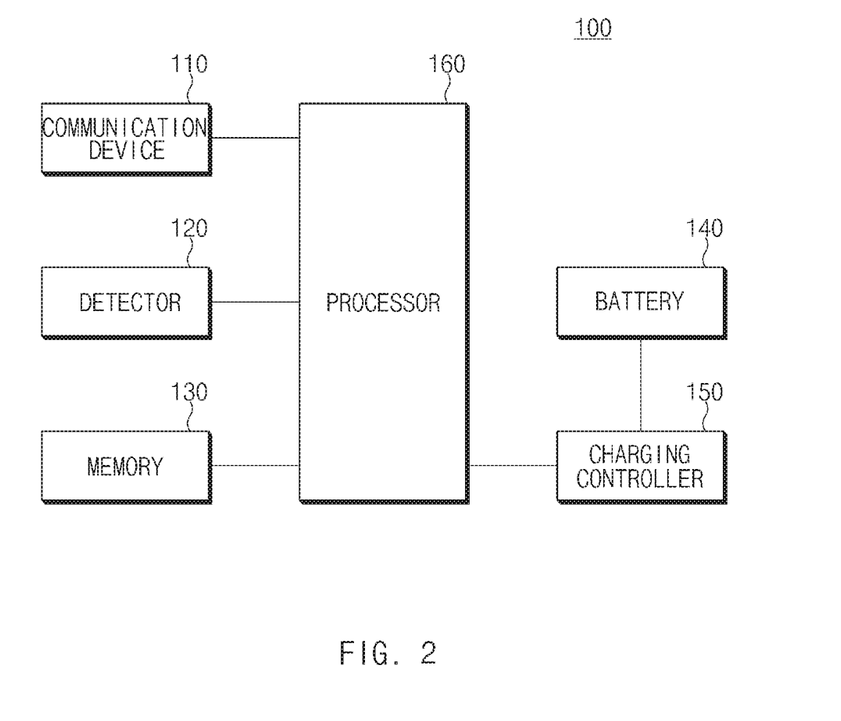
FIG. 2 is a block diagram of a vehicle illustrated in FIG. 1.

FIG. 2 illustrates a block diagram of a vehicle illustrated in FIG. 1.

Referring to FIG. 2, the vehicle 100 includes a communication device 110, a detector 120, a memory 130, a battery 140, a charging controller 150, and a processor 160.

The communication device 110 is a hardware device and may wirelessly communicate with the server 300. The communication device 110 transmits vehicle information to the server 300 under control of the processor 160.

The communication device 110 performs data communication with the mobile charger 200. The communication device 110 transmits authentication information to the mobile charger 200 for charging.

In the present disclosure, examples of the communication device 110 include a computer modem, a network interface card (NIC), Wi-Fi devices, an access point, etc.

The detector 120 is connected to various sensors, electric control units (ECUs), a navigation terminal, and the like, which are mounted in the vehicle 100, through an in-vehicle network. The in-vehicle network may be implemented with Controller Area Network (CAN), Media Oriented Systems Transport (MOST) network, Local Interconnect Network (LIN), and/or X-by-Wire (Flexray).

The detector 120 obtains the vehicle information through various sensors, ECUs, and a navigation terminal. The vehicle information may include vehicle identification information, a vehicle battery level, an expected time of battery depletion, a movable distance, a vehicle speed, navigation information, and the like. The navigation information may include a driving path to the destination, a movement path to the destination, and the like based on a current location of the vehicle 100, a destination, map data stored in a memory (not illustrated), as information received from the navigation terminal.

Herein, the various sensors may include a speed sensor, a steering angle sensor, an image sensor, and the like. The ECUs may include an Engine Control Unit (ECU), a Transmission Control Unit (TCU), a Brake Control Unit (BCU), a Battery Management System (BMS), and the like.

The memory 130 may store a program programmed for the processor 160 to perform the specified operation. The memory 130 may temporarily store input data and/or output data of the processor 160. The memory 130 may store the vehicle information obtained through the detector 120.

The memory 130 may be implemented with at least one or more storage media (recording media) among a flash memory, a hard disk, a Secure Digital (SD) card, a Random Access Memory (RAM), a Read Only Memory (ROM), an Electrically Erasable and Programmable ROM (EEPROM), an Erasable and Programmable ROM (EPROM), a register, a removable disc, web storage, and the like.

The battery 140 supplies driving power necessary to drive a motor as a high-output, high-capacity, and high-voltage battery mounted in an eco-friendly vehicle.

The charging controller 150 charges the battery 140 with the externally supplied charging power. The charging controller 150 monitors the charging amount (battery level) of the battery 140, a battery state (overvoltage, overcurrent, overheat, or the like), or the like in real time. The charging controller 150 may include an overcharging preventing circuit. The charging controller 150 may be implemented with the BMS.

The charging controller 150 may support wireless charging and/or wired charging. For the purpose of supporting the wireless charging, the charging controller 150 may include a power receiver (not illustrated), which receives wireless power from the mobile charger 200, and a power converter that converts the wireless power into a charging voltage for battery charging to supply the charging voltage to the battery 140.

For the purpose of supporting the wired charging, the charging controller 150 may include a charging port for connecting to the mobile charger 200 and a power converter that converts power supplied through the charging port into a charging voltage.

The processor 160 transmits vehicle information, which is collected through the detector 120, to the server 300 through the communication device 110, when satisfying a preset transmission condition. For example, the processor 160 transmits the vehicle information at a preset period (e.g., 5 minutes).

The processor 160 may transmit a battery charging request signal to the server 300, when a user directly makes a request for battery charging through a user interface (not illustrated). Herein, the user interface may be implemented with a button, a key pad, a dome switch, a touch pad (static voltage/static current), a jog wheel, and/or a jog switch.

The processor 160 receives charging location information from the server 300 through the communication device 110. The processor 160 displays the received charging location information on a display and waits for the user's approval of the received charging location information. The processor 160 sets the charging location to a waypoint in a navigation terminal, when the user approves the received charging location information. Furthermore, the processor 160 transmits a notification of the user's approval of the received charging location information, to the mobile charger 200 through the server 300.

The processor 160 may determine whether the mobile charger 200 arrives at the charging location, when the vehicle 100 arrives at the charging location. The processor 160 stands by until the mobile charger 200 arrives at the charging location, when the mobile charger 200 does not arrive at the charging location. The processor 160 starts the charging of the battery 140, when the mobile charger 200 arrives at the charging location.

The processor 160 may include at least one or more of an Application Specific Integrated Circuit (ASIC), a Digital Signal Processor (DSP), a Programmable Logic Devices (PLD), Field Programmable Gate Arrays (FPGAs), a Central Processing Unit (CPU), micro-controllers, and microprocessors.

Figure 3:
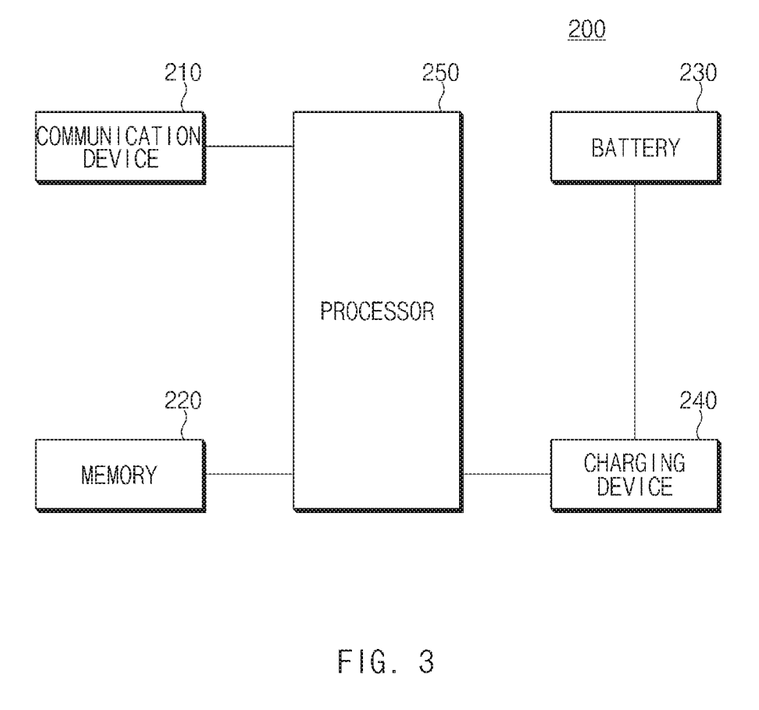
FIG. 3 is a block diagram of a mobile charger illustrated in FIG. 1.

FIG. 3 illustrates a block diagram of a mobile charger illustrated in FIG. 1.

As shown in FIG. 3, the mobile charger 200 is a movable charging station and includes a communication device 210, a memory 220, a battery 230, a charging device 240, and a processor 250.

The communication device 210 is a hardware device and wirelessly communicates with the server 300. The communication device 210 transmits charger information to the server 300 under control of the processor 250.

The communication device 210 also wirelessly communicates with the vehicle 100. The communication device 210 transmits billing information according to charging use, under control of the processor 250.

In the present disclosure, examples of the communication device 210 include a computer modem, a network interface card (NIC), Wi-Fi devices, an access point, etc.

The memory 220 may store a program programmed for the processor 250 to perform the specified operation. The memory 220 may temporarily store input data and/or output data of the processor 250.

The memory 220 may be implemented with at least one or more storage media (recording media) among a flash memory, a hard disk, a Secure Digital (SD) card, a RAM, a ROM, an EEPROM, an EPROM, a register, a removable disc, web storage, and the like.

The battery 230 stores power energy for supporting vehicle charging. An embodiment of the present disclosure is exemplified as being implemented with the battery 230. However, an embodiment is not limited thereto. For example, an embodiment of the present disclosure may be implemented with a generator capable of generating electric energy such as a generator or a fuel cell.

The charging device 240 supplies the electrical energy stored in the battery 230, to the vehicle 100 as charging power. The charging device 240 supplies the electrical energy stored in the battery 230, by wire or wirelessly.

The mobile charger 200 may include the at least one or more charging devices 240. For example, the mobile charger 200 may include two wired charging devices and three wireless charging devices.

The processor 250 may collect charger information by using various sensors included in the mobile charger 200. Moreover, the processor 250 may collect battery state information through the charging device 240. The processor 250 transmits the charger information through the communication device 210. The charger information includes charger identification information, the level of the battery 230 (charger battery level), the coverable number of vehicles, a movable distance, a speed, and the like.

The processor 250 receives standby location information from the server 300 through the communication device 210. The processor 250 outputs the received standby location information in the form that an administrator managing the mobile charger 200 is capable of recognizing. The administrator verifies the standby location and moves the mobile charger 200 to the corresponding standby location.

The processor 250 transmits the received standby location information to an autonomous driving control device (not illustrated) in the mobile charger 200. The autonomous driving control device (not illustrated) moves the mobile charger 200 to the corresponding standby location based on the received standby location information.

The processor 250 stands by at the corresponding standby location, when the mobile charger 200 arrives at the standby location. The processor 250 directs the mobile charger 200 to move to the corresponding charging location, when receiving charging location information approved by a vehicle to be charged, from the server 300 on standby. The mobile charger 200 is moved to the charging location by the administrator or the autonomous driving control device.

The processor 250 may determine whether the vehicle 100 to be charged arrives at the corresponding location, when the mobile charger 200 arrives at the charging location. The processor 250 stands by until the vehicle 100 to be charged arrives, when the vehicle 100 to be charged does not arrive at the corresponding location.

The processor 250 controls the charging device 240 to perform the charging of the corresponding vehicle 100, when the vehicle 100 to be charged arrives at the charging location. The processor 250 performs an authentication procedure on the vehicle 100 to be charged; the processor 250 supplies charging power to the corresponding vehicle when the authentication is successful. In addition, the processor 250 charges the charging vehicle depending on a predetermined billing charging system. That is, the processor 250 transmits billing information to the charging vehicle.

The processor 250 includes at least one or more of an ASIC, a DSP, a PLD, FPGAs, a CPU, micro-controllers, and microprocessors.

Figure 4:
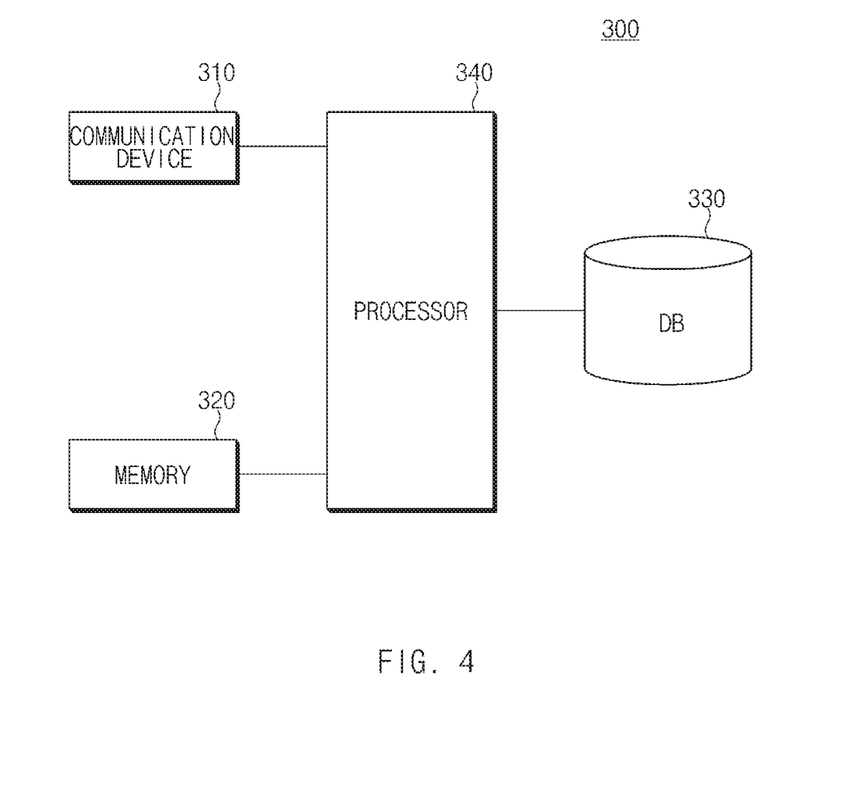
FIG. 4 is a block diagram of a mobile charging support server illustrated in FIG. 1.

FIG. 4 illustrates a block diagram of a mobile charging support server illustrated in FIG. 1.

The mobile charging support server 300 includes a communication device 310, a memory 320, a database 330 (hereinafter referred to as a "DB"), and a processor 340.

The communication device 310 exchanges data (information) with the vehicle 100 and the mobile charger 200. The communication device 310 receives vehicle information transmitted from each of the vehicles 100 and charger information transmitted from each of the mobile chargers 200 to transmit the vehicle information and the charger information to the processor 340. The communication device 310 transmits standby location information to the mobile charger 200 under control of the processor 340. Furthermore, the communication device 310 transmits charging location information to the vehicle 100 under control of the processor 340.

In the present disclosure, the communication device 310 is a hardware device capable of transmitting an analog or digital signal over communication wire or wirelessly, and examples thereof include a computer modem, a network interface card (NIC), Wi-Fi devices, an access point, etc.

The memory 320 may store a program programmed for the processor 340 to perform the predetermined operation. The memory 320 may store an algorithm for optimizing the standby location of the mobile charger 200 and an algorithm for optimizing the charging location and the charging time of each of the vehicles 100. Moreover, the memory 320 may store map data. The map data may be used to determine the standby location and the charging location.

The memory 320 may be implemented with at least one or more storage media (recording media) among a flash memory, a hard disk, a Secure Digital (SD) card, a RAM, a ROM, an EEPROM, an EPROM, a register, a removable disc, web storage, and the like.

The DB 330 may store information about the vehicle 100, which subscribes a mobile charging support service, and the mobile charger 200. The DB 330 stores and manages the vehicle information from the vehicle 100 and the charger information from the mobile charger 200.

The processor 340 collects the vehicle information and the charger information from at least one or more vehicles 100 and the at least one or more mobile chargers 200. The processor 340 performs clustering on a range that the mobile charger 200 is capable of covering, based on the vehicle information and the charger information. For example, the processor 340 performs clustering based on the number of vehicles that the mobile charger 200 is capable of covering, a coverable radius, a coverable movement distance, a coverable movement path, a movable speed, and the like.

The processor 340 determines the standby location of the mobile charger 200 in each cluster, based on the charger information of the mobile charger 200. The processor 340 directs the mobile charger 200 to move to the corresponding standby location and to stand by, when the standby location is determined.

The processor 340 selects a charging location in consideration of the movement path of each of the vehicles 100 in each cluster. At this time, the processor 340 selects an optimal charging location in consideration of the battery level of each of the vehicles 100.

After selecting the charging location of each of the vehicles 100, the processor 340 transmits the selected charging location information to the corresponding vehicle 100. The processor 340 transmits the charging location approved by the vehicle 100, to the mobile charger 200 when receiving the approval of the charging location from the vehicle 100. Afterwards, the vehicle 100 and the mobile charger 200 move to the approved charging location to perform the charging of the vehicle 100.

The processor 340 includes at least one or more of an ASIC, a DSP, a PLD, FPGAs, a CPU, micro-controllers, and microprocessors.

In addition, the communication devices 110, 210, and 310 may include Bluetooth devices, infrared devices, a modem, a network card, a smart phone, Wi-Fi devices.

Figure 5:
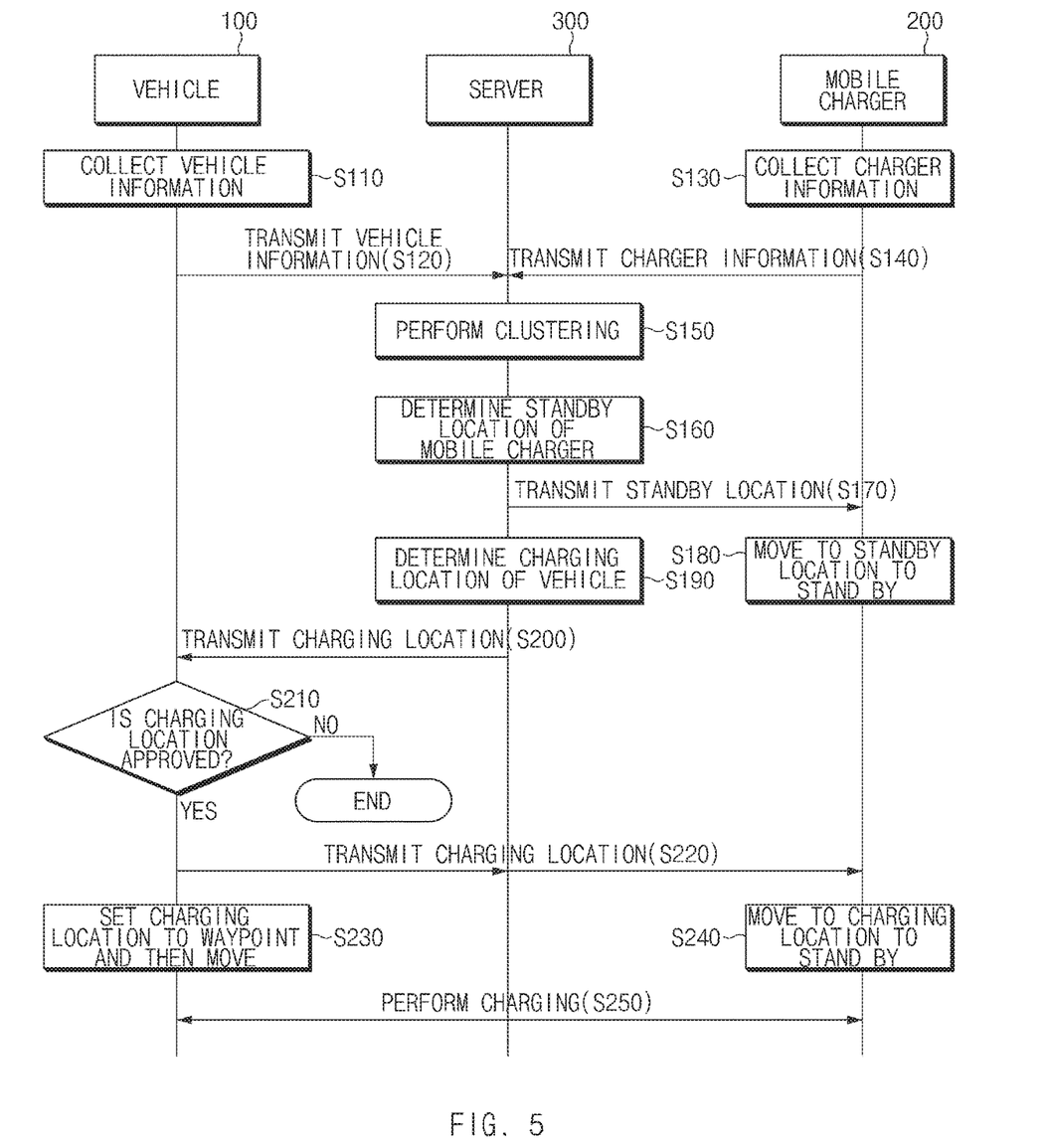
FIG. 5 is a flowchart illustrating an operation method of a mobile charging system, according to an embodiment of the present disclosure.

FIG. 5 is a flowchart illustrating an operation method of a mobile charging system, according to an embodiment of the present disclosure.

Referring to FIG. 5, in operation S110, the processor 160 of the vehicle 100 may collect vehicle information through the detector 120. The vehicle information includes at least one or more of vehicle identification information, information about a battery level, information about a destination, information about a driving path to the destination, information about the expected battery usage amount, information about a movable distance, and the like.

In operation S120, the vehicle 100 transmits the collected vehicle information to the server 300 through the communication device 110. For example, the vehicle 100 transmits the vehicle information over telematics communication at a specified period.

In operation S130, the processor 250 of the mobile charger 200 collects charger information. The charger information includes at least one or more of charger identification information, information about a battery level, information about a movable distance, information about a movable speed, information about the coverable number of vehicles, and the like.

In operation S140, the processor 250 of the mobile charger 200 transmits the collected charger information to the server 300 through the communication device 210. The mobile charger 200 transmits the collected charger information at a specified period. At this time, the mobile charger 200 may transmit the charger information by using the telematics communication.

For the purpose of helping understand the present disclosure, an embodiment is exemplified as a process of collecting and transmitting information of a vehicle and a process of collecting and transmitting information of a charger are sequentially performed. However, an embodiment is not limited thereto. For example, the process of collecting and transmitting information of a vehicle and the process of collecting and transmitting information of a charger are performed at the same time.

In operation S150, the server 300 performs clustering in a range that the mobile charger 200 is capable of covering, based on the received vehicle information and the received charger information when the server 300 receives the vehicle information and the charger information from the vehicle 100 and the mobile charger 200.

In operation S160, the server 300 determines the standby location of the mobile charger 200 in each cluster, based on the received vehicle information and the received charger information.

In operation S170, the server 300 transmits the standby location of the mobile charger 200 in each cluster, to the corresponding mobile charger 200.

In operation S180, the mobile charger 200 receives the standby location from the server 300 and moves to the received standby location to stand by In operation S190, the server 300 determines the charging location of each of the vehicles 100 in each cluster in consideration of the received vehicle information and the received charger information.

In operation S200, the server 300 transmits the charging location of each of the vehicles 100 to the corresponding vehicle 100.

In operation S210, the vehicle 100 may determine whether the charging location provided from the server 300 is approved. That is, the vehicle 100 may determine whether a user has approved the charging location.

In operation S220, the vehicle 100 transmits the approved charging location to the mobile charger 200 via the server 300, when the charging location is approved. The server 300 transmits the approved charging location, which is transmitted from the vehicle 100, to the mobile charger 200 within the same cluster over the telematics communication.

In operation S230, the vehicle 100 sets the approved charging location to a waypoint in a navigation terminal and then moves to the corresponding charging location. The navigation terminal of the vehicle 100 sets the approved charging location to the waypoint and then provides the guidance. A driver moves the vehicle 100 to the charging location depending on directions.

In operation S240, the mobile charger 200 moves to the corresponding charging location to stand by, when receiving the approved charging location. The mobile charger 200 is moved to the charging location by an administrator or is moved to the charging location by an autonomous driving control device (not illustrated).

In operation S250, the vehicle 100 and the mobile charger 200 performs vehicle charging, when arriving at the approved charging location. The mobile charger 200 performs an authentication procedure on the vehicle 100, and the mobile charger 200 supplies charging power to the corresponding vehicle 100, when the authentication is successful. The mobile charger 200 transmits billing information according to the charging, to the corresponding vehicle 100, when the vehicle charging is completed. The mobile charger 200 generates the billing information based on the predetermined billing charging system.

Embodiments are exemplified as the vehicle 100 and the mobile charger 200 communicate with each other via the server 300. However, the vehicle 100 and the mobile charger 200 exchange data with each other by using a short range wireless communication technology and/or a wired/wireless communication technology.

The present disclosure is located at an optimal standby location of a mobile charging station by using information provided from a vehicle and a mobile charging station, thereby reducing the operation cost of the mobile charging station and improving efficiency thereof.

Furthermore, the present disclosure determines an optimal charging location by using information provided from a vehicle and a mobile charging station, and thus the vehicle moves to the arranged charging location within the driving path of the vehicle to perform charging regardless of finding the location of the mobile charging station, thereby enhancing the convenience of a user.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. A mobile charging system comprising:
at least one or more vehicles configured to collect and transmit vehicle information;
at least one or more mobile chargers configured to collect and transmit charger information and configured to supply charging power to the at least one or more vehicles; and
a server configured to:
perform clustering within a range that each of the at least one or more mobile chargers is capable of covering, based on the vehicle information and the charger information;
determine a standby location of each of the at least one or more mobile chargers in each cluster based on the charger information; and
determine a charging location of each of the at least one or more vehicles in each cluster based on the vehicle information,
wherein each of the at least one or more mobile chargers moves to the standby location determined by the server, and then stands by.

2. The mobile charging system of claim 1, wherein the vehicle information includes:
vehicle identification information, a vehicle battery level, a destination, a movement path, and a vehicle speed.

3. The mobile charging system of claim 1, wherein the charger information includes:
charger identification information, a charger battery level, a movable distance, and a movable speed.

4. The mobile charging system of claim 1, wherein the server performs the clustering based on a number of vehicles that each of the at least one or more mobile chargers in each cluster is capable of covering, and further based on a movable distance and a movable path.

5. The mobile charging system of claim 1, wherein the server wirelessly communicates with the at least one or more vehicles and the at least one or more mobile chargers.

6. The mobile charging system of claim 1, wherein each of the at least one or more mobile chargers moves to the determined charging location to perform vehicle charging, when each of the at least one or more vehicles approves the charging location determined by the server.

7. The mobile charging system of claim 1, wherein each of the at least one or more mobile chargers supplies charging power by wired or wirelessly.

8. A mobile charging support server comprising:
 a communication device configured to receive vehicle information and charger information from at least one or more vehicles and at least one or more mobile chargers; and
 a processor configured to:
  perform clustering within a range that each of the at least one or more mobile chargers is capable of covering, based on the vehicle information and the charger information,
  determine a standby location of each of the at least one or more mobile chargers in each cluster based on the charger information, and
  determine a charging location of each of the at least one or more vehicles in each cluster based on a movement path included in the vehicle information,
  wherein each of the at least one or more mobile chargers moves to the standby location determined by the server, and then stands by.

9. A vehicle comprising:
 a battery;
 a detector configured to obtain vehicle information;
 a communication device configured to transmit the vehicle information to a server;
 a processor configured to direct the vehicle to move to a charging location, when receiving the charging location from the server; and
 a charging controller configured to receive charging power from a mobile charger, which moves to the charging location, to control charging of the battery after the vehicle arrives at the charging location,
 wherein the server performs clustering within a range that each of the at least one or more mobile chargers is capable of covering, based on the vehicle information and the charger information,
 wherein the server determines a standby location of the mobile charger in each cluster based on charger information, and determines the charging location based on a movement path included in the vehicle information, and
 wherein one or more mobile charger moves to the standby location by the server, and then stands by.

10. An operation method of a mobile charging system, the method comprising steps of:
 receiving, by a server, vehicle information and charger information from at least one or more vehicles and at least one or more mobile chargers;
 performing, by the server, clustering within a range that each of the at least one or more mobile chargers is capable of covering, based on the vehicle information and the charger information;
 determining, by the server, a standby location of each of the at least one or more mobile chargers in each cluster based on the charger information;
 determining, by the server, a charging location of each of the at least one or more vehicles in a respective cluster based on a movement path included in the vehicle information;
 moving each of the at least one or more mobile chargers to the standby location determined by the server, and then standing by, and
 moving each of the at least one or more mobile chargers to the charging location determined by the server to perform charging of each of the at least one or more vehicles.

11. The method of claim 10, wherein the vehicle information includes:
 vehicle identification information, a vehicle battery level, a destination, a movement path, and a vehicle speed.

12. The method of claim 10, wherein the charger information includes:
 charger identification information, a charger battery level, a movable distance, and a movable speed.

13. The method of claim 10, wherein in the step of performing the clustering, the server performs the clustering based on the number of vehicles that each of the at least one or more mobile chargers in the respective cluster is capable of covering, a movable distance, and a movable path.

14. The method of claim 10, wherein the server wirelessly communicates with the at least one or more vehicles and the at least one or more mobile chargers over telematics communication.

15. The method of claim 10, wherein each of the at least one or more mobile chargers moves to the standby location determined by the server, and then stands by.

16. The method of claim 10, wherein each of the at least one or more mobile chargers moves to the determined charging location to perform vehicle charging, when each of the at least one or more vehicles approves the charging location determined by the server.

17. The method of claim 10, wherein each of the at least one or more mobile chargers supplies charging power by wired.

18. The method of claim 10, wherein each of the at least one or more mobile chargers supplies charging power wirelessly.

* * * * *